Feb. 11, 1930.  W. L. FARMER  1,746,248
PISTON RING
Filed March 14, 1929  2 Sheets-Sheet 1
Fig. 1.
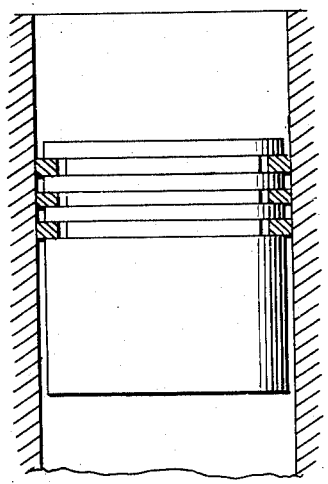
Fig. 2.
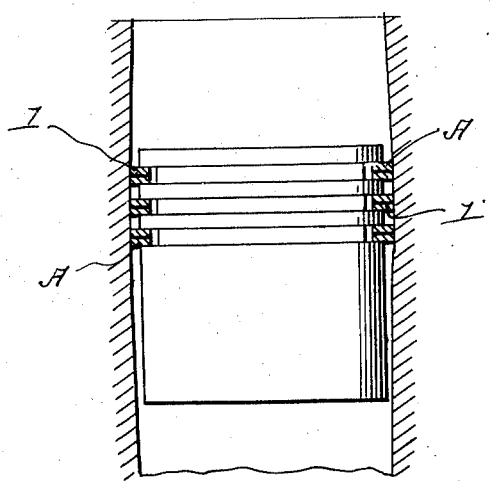
Fig. 7.
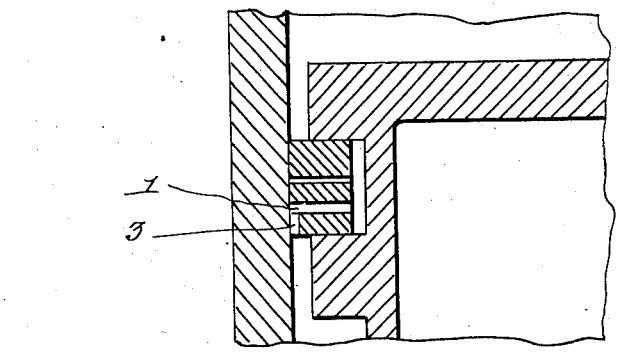
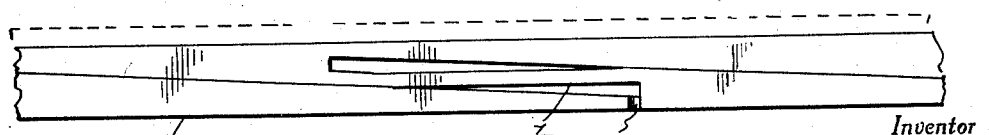
Fig. 8.
Inventor
W. L. Farmer
By Clarence A. O'Brien
Attorney Feb. 11, 1930.  W. L. FARMER  1,746,248
PISTON RING
Filed March 14, 1929    2 Sheets-Sheet 2
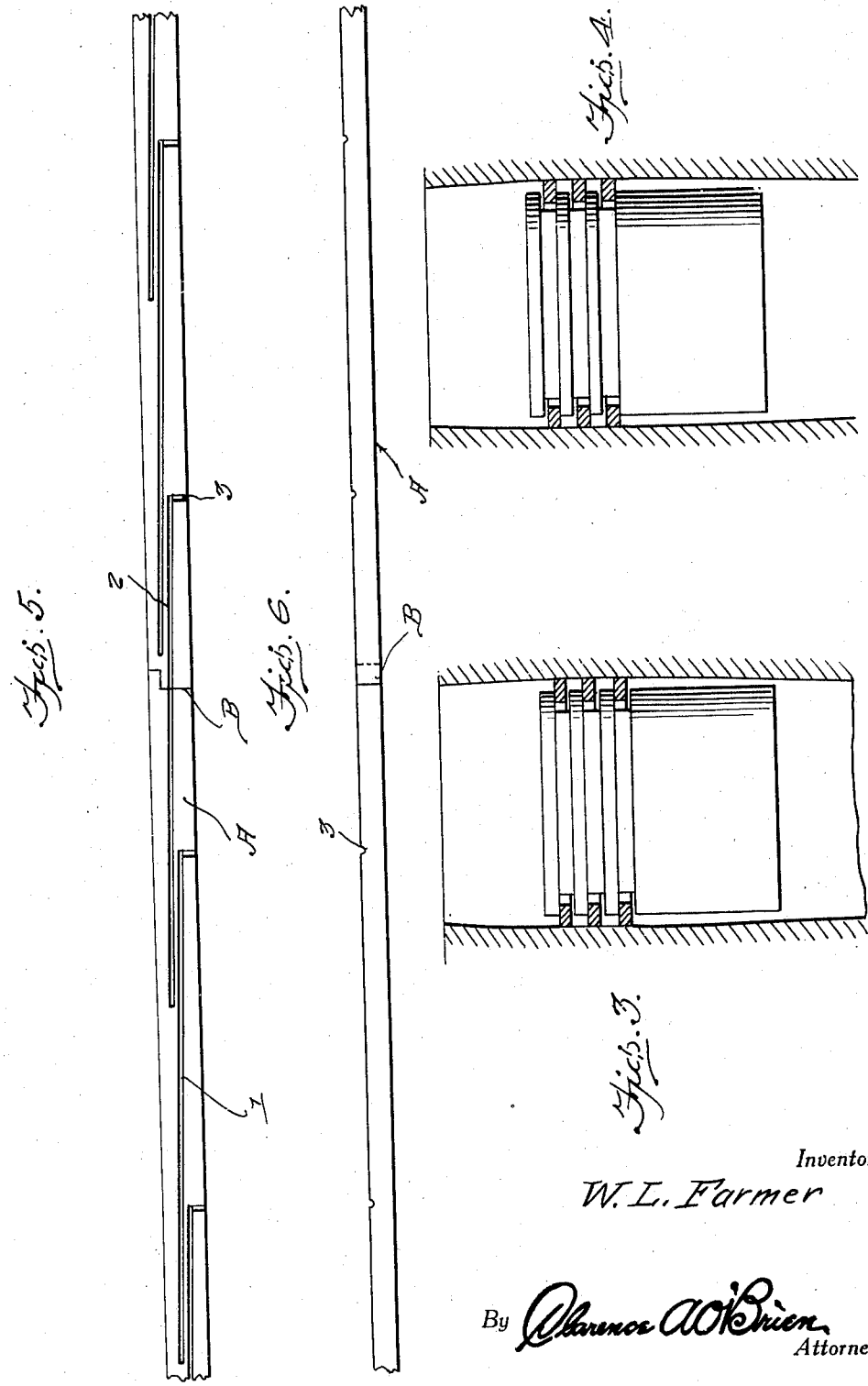
Inventor
W. L. Farmer
By Clarence A. O'Brien
Attorney Patented Feb. 11, 1930

1,746,248

UNITED STATES PATENT OFFICE

WALTER L. FARMER, OF HOUSTON, TEXAS

PISTON RING

Application filed March 14, 1929. Serial No. 347,018.

This invention relates to piston or sealing rings of that type in which the ring is trans-split to provide an overlapping split of the step cut variety, and being provided on its circumference with a plurality of long oblique slots resulting in a ring capable of both radial and axial flexibility.

The primary object of this invention is to provide a ring of the character set forth having relatively long slots extending obliquely, circumferentially of the ring, said ring being slit to provide overlapping ends with a long oblique slot through the slit in order to obtain axial expansion at this point.

A further object of the invention is to so design a ring to exert the maximum pressure axially as well as radially, with a minimum number of cuts to insure the prevention of the collapse of the ring.

It is well known that oil pumping in all internal combustion engines is caused, not by the oil leaking around the outside of the ring between the cylinder wall and the face of the ring, but by oil penetrating behind the ring and pumping above the ring, as the piston is forced to the top of the cylinder.

Again, oil dilution is caused by carbon gases escaping around the rings as they move up or down with respect to the movement of the piston when the rings become worn, thus leaving a gap below the ring on the downstroke of the piston and above the ring on the upstroke of the piston, which allows burned oil and carbon to collect behind the ring and also dilute the oil in the crank case.

To prevent these well known facts the piston ring must at all times be in contact with the piston groove at both the upper and lower surfaces of the ring and must not allow the passage of oil to the top of the ring.

It is therefore, with this in mind that I have attempted to design a ring which will embody all of these features, yet retain the maximum amount of its strength.

These and numerous other advantages will be readily apparent from a study of the following description clearly illustrating the details of my improved piston ring, taken in connection with the accompanying drawings, wherein:

Figure 1 is a view illustrating a new piston and cylinder, and equipped with the ordinary type of piston ring, Figure 2 is a view showing a worn piston and cylinder equipped with the proposed ring which fits closely at the top and bottom in each groove, Figures 3 and 4 show the condition of cylinders, pistons and rings after much wear, Figure 5 is a view of a portion of the periphery of my improved piston ring, Figure 6 is a fragmentary view of the bottom edge of the piston ring embodying my invention, Figure 7 is a section showing the ring in place in the piston of an internal combustion engine, and Figure 8 shows in elevation my improved piston ring when compressed.

In the drawings, attention is invited to Figure 1 wherein is illustrated a normal new piston and cylinder and the ring fitting closely at the top and bottom in each groove. Attention is next directed to Figures 3 and 4 in the drawings which show the same cylinder, piston and rings after much wear. As herein illustrated, the cylinder walls have become bellied somewhat by wear and the rings have acquired a certain amount of play in the grooves. In connection with this it is to be mentioned that pistons and cylinders in this worn condition cause oil pumping in the following manner; the piston moves downwardly in the cylinder, oil which is deposited on the cylinder walls is collected behind the rings, hence the rings are now in the position as shown in Figure 3 of the drawings.

The piston upon reaching the bottom starts on the upstroke, and more oil is wiped from the face of the cylinder wall and collected behind the rings, hence the rings are now in position shown in Figure 4. As the piston nears the top of the cylinder, the rings begin to contract due to the curvature of the worn cylinder walls, and the oil collected behind the rings is forced above the rings and deposited on the cylinder wall at the dead center of the upstroke.

Figure 2 clearly illustrates how this action is prevented by the sealing qualities of my ring, and it is to prevent this action that I have designed a piston ring of a structure to be hereinafter described.

To overcome these well known facts, a piston ring must be provided which is capable of axial compression before it is fitted into the piston ring groove in order that it will expand in the groove and seal itself around the top and bottom edges. To accomplish this I therefore propose a ring such as is clearly illustrated in the drawings, and is generally designated by the reference letter A.

As above illustrated, in the improved construction of my ring, slots 1 are cut through the ring so as to extend slantwise the face of the ring. As shown to advantage in Figure 5 of the drawings these slots 1 are disposed in overlapping relation to extend obliquely circumferentially of the ring.

Between the overlapped portion of these slots there will be a solid section 2 which we shall call the distortion member. This member 2 must be thin enough to distort when pressure is applied to the top and bottom of the ring without causing the top or bottom surface of the ring to distort. The slots 1 are preferably six in number and by being arranged on the ring in such a manner as before pointed out at least one-half of the ring will not be split by more than one slot thereby forming large solid sections to receive the wear of the piston wall and to maintain the maximum of radial expanding strength after the slots to provide axial expansion have been made.

In order that the surplus oil collected in the piston ring grooves can be discharged below the ring instead of above the ring as the piston nears the top of the cylinder, small grooves 3 are cut into the face of the ring at one end of the slots 1. The grooves 3 are cut only a fraction of the way into the face of the ring as is clearly illustrated in Figure 6 of the drawing.

The split D in the ring is formed by having the ends of the ring in overlapping relation (step cut fashion) and as shown to advantage in Figure 5 of the drawings one of the long oblique slots extends through the split in order to obtain axial expansion at this point.

The working principle of the ring is as follows: Prior to being placed within the groove on the piston, the ring will be axially compressed the thickness of one cut and will expand when released within the groove causing it to fit closely at top and bottom in the piston groove.

Thus it will be readily seen that the close fit of the ring within the groove will permit but very little oil to collect behind the ring, and as the piston works up and down within the worn cylinder and the rings work in and out of the piston grooves, no oil can pass above the rings as the oil must be forced out through the slots 1 to be carried by the small grooves 3 to the bottom of the ring.

I propose to make my ring about the same radial thickness as an ordinary .005 oversize ring. When the slots are cut in this ring, due to the large solid sections remaining, the ring will have approximately the same expanding power as an ordinary standard size piston ring.

Furthermore by the use of small grooves to be cut in the face of the ring from the bottom of each slot provision is made to allow for the expulsion of surplus oil from behind the ring.

Having thus described my invention, what I claim as new and desire to secure by Letters Patent is:—

1. A piston ring provided with relatively long slots extending through the ring, and arranged obliquely circumferentially of the ring, and arranged in overlapping relation to provide relatively wide solid sections adjacent the opposite ends of the slots, and relatively narrow solid sections between the overlapping portions of said slots, and grooves formed in the face of the ring and disposed at one end of each of the slots.

2. A transsplit piston ring provided with a plurality of separate circumferentially disposed slots arranged in overlapping relation to provide a narrow flexible bar between the overlapping portions of the slots, and relatively wide solid portions adjacent the respective slots, grooves formed on the said wide portions and communicating with one end of the respective slots, and one of said slots extending through the slit formed in the ring.

3. A transsplit ring provided with a plurality of elongated longitudinally extending slots arranged circumferentially thereon, said slots being disposed in overlapping relation at their adjacent ends, whereby to provide relatively large solid sections at the ends of the slots, and relatively narrow solid sections between the overlapping ends of said slots, said narrow portion merging into said solid section at the extremities of the slots at the overlapping ends of said slots, whereby said ring is capable of radial and axial expansion, and said relatively narrow solid sections between the overlapping ends of the slots cooperating with the slots to prevent complete collapse of the ring when said ring is in compressed condition, and said slots having at their lower ends communication with grooves extending vertically of said ring to provide a drain for said slots.

In testimony whereof I affix my signature.

WALTER L. FARMER.